(No Model.)
J. B. KIMBELL.
GUANO DISTRIBUTER.
No. 595,950. Patented Dec. 21, 1897.
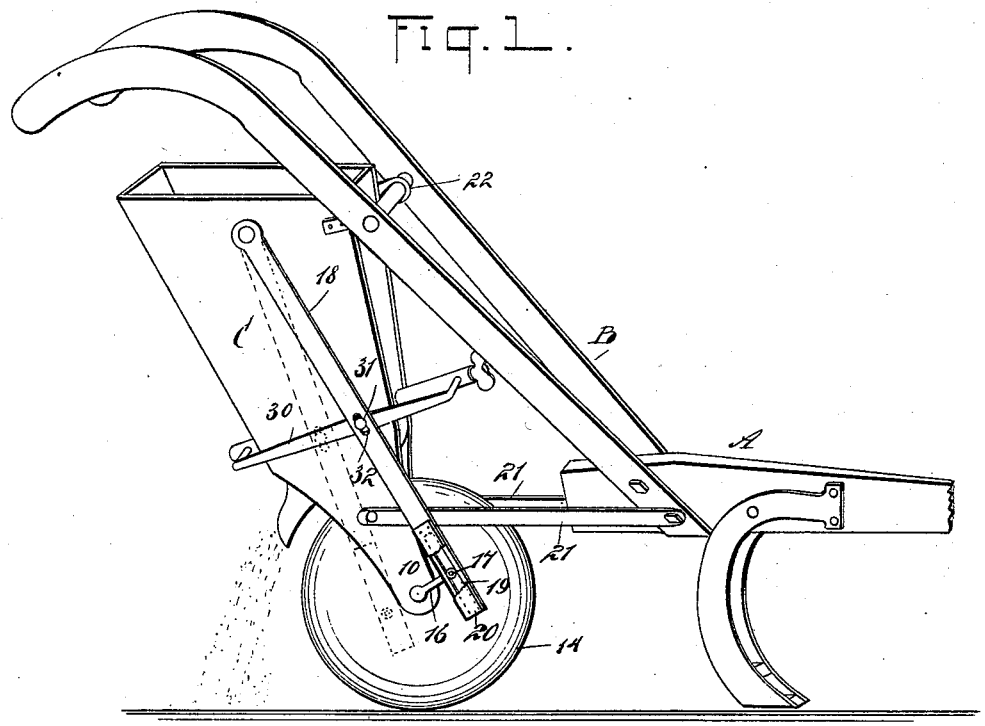
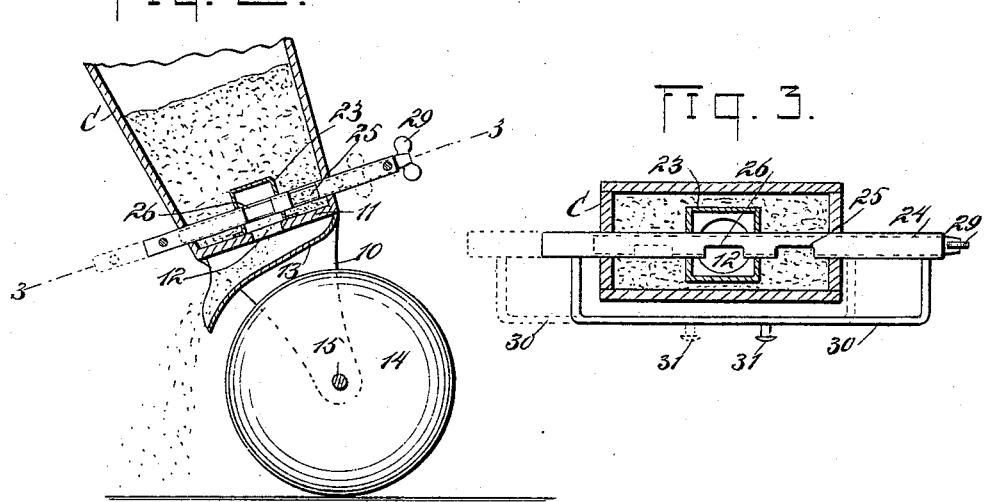
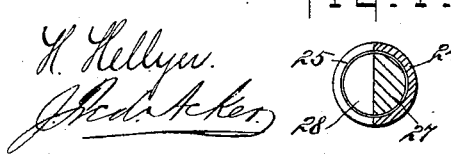
WITNESSES:
INVENTOR
J. B. Kimbell
BY
ATTORNEYS.

UNITED STATES PATENT OFFICE.

JOHN B. KIMBELL, OF ALPHARETTA, GEORGIA.

GUANO-DISTRIBUTER.

SPECIFICATION forming part of Letters Patent No. 595,950, dated December 21, 1897.

Application filed June 15, 1897. Serial No. 640,815. (No model.)

*To all whom it may concern:*

Be it known that I, JOHN B. KIMBELL, of Alpharetta, in the county of Milton and State of Georgia, have invented a new and Improved Guano-Distributer, of which the following is a full, clear, and exact description.

The object of my invention is to provide a machine especially adapted for the distribution of guano and other fertilizers and which may be readily and expeditiously attached to the rear of a plow or like agricultural implement.

A further object of the invention is to construct an implement of the character above described in a simple, durable, and economic manner and to provide a means whereby the amount of fertilizing material to be distributed may be regulated as desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device attached to a plow. Fig. 2 is a vertical section through a portion of the device. Fig. 3 is a horizontal section on the line 3 3 of Fig. 2. Fig. 4 is a transverse section through the distributing slide or device, showing a pocket therein opened to its fullest extent; and Fig. 5 is a section similar to the section shown in Fig. 4, illustrating the pocket as partially closed.

A represents a plow-beam, and B the handles for the same. In the construction of the device a hopper C is employed, which is preferably made tapering, being narrowest at the bottom, and the sides of the hopper are carried down below the bottom 11, forming side ears 10, as illustrated in Figs. 1 and 2, the bottom being provided at its center with an outlet-opening 12, beneath which a trough 13 is secured, being adapted to conduct the material in the hopper to the rear of its bottom and distribute it on the ground.

A shaft 15 is journaled in the ears 10, and on the said shaft a wheel 14 is firmly secured, while at one end of the shaft a crank-arm 16 is formed, being provided at its free end with a friction-roller 17. A pitman 18 is pivoted on the side of the hopper or receptacle C, near the top. This pitman extends downward to a point below the ears 10 and is provided at its lower end with a longitudinal slot 19. This slot receives the friction-roller 17, and the roller is held in the slot and said slot is prevented from being filled with earth, dust, and the like by means of a cap-plate 20. (Shown in Fig. 1.) Links 21, attached to the sides of the hopper, are likewise secured to the beam A of the plow, serving to connect the lower portion of the device to the plow, while the upper end of the device is attached by hooks 22 or their equivalents to the upper cross-bar connecting the handles B of said plow.

In the bottom of the hopper or receptacle C a box 23 is erected over the opening 12, as shown in Figs. 2 and 3. The distributing device or slide is passed through this box, having end movement therein. The distributing device or slide consists of a hollow body 24 of cylindrical form, which body is provided with pockets 25 26 in one of its sides, vertically disposed, and the said pockets are placed at such distances apart that when one of the pockets is outside of the box 23 the other pocket will be within the said box, as shown in both Figs. 2 and 3.

Within the hollow body 24 a regulating-rod 27 is held to turn, the regulating-rod being provided with pockets 28, corresponding in number and location to the pockets in the body of the said distributing device, and the rod is turned through the medium of a thumbscrew 29 or its equivalent, located at one side of the rod. Thus it will be observed that by turning the rod 27 the pockets 25 and 26 in the body 24 of the distributing device may be opened to their full capacity or the said regulating-rod may be turned, as illustrated in Fig. 5, in a manner to entirely or partially close the pockets in the body of the distributing device.

The distributing device is reciprocated through the medium of an arm 30, which is attached at its ends to the end portions of the body of said device, as shown in Figs. 1 and 3, the arm 30 extending across the side of the receptacle or hopper C out of contact therewith. At or near the center of the arm 30 a pin 31 is located, which is made to enter and has limited movement in a longitudinal opening 32, made in the pitman 18.

In operation as the wheel 14 passes over the ground it will impart a swinging movement to the pitman 18, and said pitman will cause the distributing device to have end movement, the said distributing device passing freely through the front and rear portions of the hopper. As the distributing device is given its end movement one of the pockets, which has been filled with the material placed in the hopper, will deposit said material in the box 23, and the material will pass out through the opening in the bottom of the hopper or receptacle into the trough 13, the other pocket in the meantime becoming filled, and so on at each forward and backward movement of the distributing device it will receive material from the hopper and deliver material therefrom.

Having thus described my invention, I claim as new and desire to secure by Letters Patent—

1. The combination of a hopper, a hollow cylindrical slide having openings or pockets, a rod having similar openings or pockets mounted in the slide and adapted to be turned within it to adjust the size of the openings, and means for reciprocating the slide.

2. A feed-slide for dropping-machines consisting of a tube having feed-openings therein, and a rod mounted in the slide and provided with similar openings in register therewith, and means for turning the rod to change the size of the openings.

3. The hopper having an aperture in its bottom, the feed-slide having openings, the rod within the slide provided with registered openings and adapted to be turned to adjust said openings, an arm or bail connected to the slide and extending on the outside of the hopper, a wheel having a cranked axle, and a pitman connected to the crank and the arm or bail for operation, substantially as described.

4. A guano-distributer attachment for plows, comprising a hopper the sides of which are extended below the bottom, a wheel journaled between said sides, an aperture in the bottom of said hopper, a box covering said aperture and provided with openings in the sides thereof, a slide having guano-pockets mounted to move through the box, a crank on the wheel-axle, and a pitman pivoted to the hopper and connected to said crank and slide, substantially as described.

5. In a guano-distributer, a hopper, having an aperture in the bottom thereof, a box covering said aperture, a slide extending through the box, said slide being hollow and provided with feed-pockets, and an adjusting-rod having similar pockets mounted within the slide and rotatable to adjust the size of the feed-pockets, and an operating-wheel for the slide, substantially as described.

6. The combination with a hopper, and a ground-wheel carried thereby and provided with a crank-arm on one end of its axle, of a distributing-slide provided with pockets and having its ends projecting through the hopper, an arm secured to the projecting ends of the slide, and a pitman pivoted to the hopper and connected to the arm of the slide and to the crank-arm, substantially as described.

JOHN B. KIMBELL.

Witnesses:
J. P. BROOKE,
J. B. PARIS.